Patented Dec. 7, 1943

2,336,093

UNITED STATES PATENT OFFICE 2,336,093

1-o-HYDROXYPHENOXY-3-ALKOXY-2-PROPANOLS AND/OR - 2 - PROPANONES AND THEIR MANUFACTURE

Adolf Grün and Willy Stoll, Basel, Switzerland, assignors to J. R. Geigy A.-G., Basel, Switzerland, a firm No Drawing. Application October 2, 1941, Serial No. 413,382. In Switzerland, September 26, 1940

10 Claims. (Cl. 260—247)

Partial etherification of polyvalent hydroxyl compounds for the preparation of well defined ethers, which still contain free hydroxyls, is, as is known, substantially more difficult in the vast majority of cases than complete etherification. It is however not only more important from a theoretical point of view, but also for practical reasons. This applies mainly to aryl ethers with free phenol hydroxyls (of which even the simplest such as guaiacol, ajacol and like, although obtainable from pyrocatechine, must still be produced technically from other initial products). It however applies more or less to their aliphatic analogues such as propanetriol- and propanediolon-ethers, i. e. mono- and di-ethers of glycerine and of dioxy-acetone of accurately defined structure.

The prospects appear to be less in finding a solution of the problem which is also satisfactory technically: Production of hydroxyaryl-alkyl-ethers, especially hydroxyaryl-alkyl-glycerine and hydroxyaryl-alkyl-dioxy acetone ethers, which in addition to the free hydroxyl group of phenolic nature are adapted, if necessary, to contain also amino groups.

As regards the combining of the residues of glycerine and polyphenols, there is already available the statement that when melting epichlorohydrin and pyrocatechine in the presence of alkali the hydroxymethyl benzodioxane is formed. (Rhône-Poulenc, French Specification 770,485.) Therefore both phenolic hydroxyls react. If now perhaps the reaction of pyrocatechine with epichlorohydrin should take place with the intermediary formation of o-hydroxyepiphenyline (see reaction diagram below), it was found to be impossible even under the mildest conditions to obtain the hypothetical intermediate product.

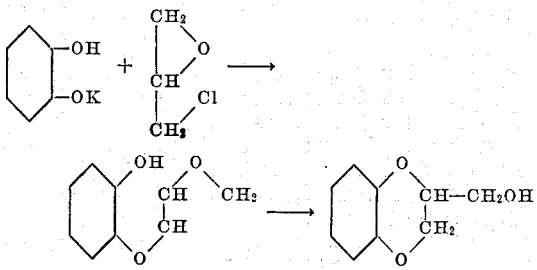

From polyvalent phenols without hydroxyls in ortho-position it is true that epihydrin ethers can be produced, for example the resorcin compound; but they can hardly be used as intermediate products, for they are also inclined to auto-condensation.

It has now been found that the synthesis is still possible by the use of epihalogenhydrin and polyvalent phenol when the two are not allowed to act directly upon one another. For example the halogen compound may first be reacted with an alcohol, whereby, as known, glycerinechlorohydrin-alkyl ethers are formed, whereupon these are caused to react with phenol. (See below, formula series right). The disubstitution of the diphenols to be expected cannot be avoided entirely in this way but in a surprising way can be sufficiently suppressed by very careful working even in the case of ortho-isomers. The further possibility, that the disubstitution of the polyvalent phenol can in fact be prevented, by temporarily masking the hydroxyls, with the exception of one, by radicals, which pass easily to phenolic oxygen and are again split off very easily, has proved particularly valuable. There may be mentioned the benzyl radical, the carbomethoxy, carbobenzyloxy radicals and other acyl radicals. Then the free hydroxyl can be esterified in a suitable manner, even by direct reaction with epihalogenhydrin and thereupon the radicals of the masked hydroxyl groups can be split off selectively. The oxidation to propanone ethers can be effected before or after the selective splitting off of the unstable radicals.

In the first instance the benzyl or benzyloxy group has proved a very well suited component for a masked hydroxyl group, capable of being split in the desired amount. Every polyvalent phenol, investigated in this respect, especially pyrocatechine, could be converted throughout satisfactorily into the monobenzyl ether. It could not be foreseen whether the benzyloxy-phenols would react with epichlorohydrin to give benzoxylated epiarylines or not, or whether they would react otherwise. Surprisingly, however, the reaction proceeds as well as that of the simple phenols. Furthermore the compounds which are thus formed can be further derivated by the addition of alcohols, namely even of tertiary amino-alcohols.

From the products thus obtained, in spite of the absence of nitro groups or other strong negative acting residues, the benzyl, carbomethoxy, and carbobenzyloxy groups can be split off smoothly. Even when the splitting off is only effected by acidolysis by means of acids, instead of hydrogenation, it proceeds selectively; the ether bonds between the glycerine radical and the aryls are not attacked.

It is very remarkable that all 1:3-dialkoxy-propanols (alkyl understood in the wider sense), produced according to the invention, can be oxidised, according to the usual methods for converting secondary alcohols into ketones, into the 1:3-dialkoxy-propanones, without prejudice to the substitution by tertiary amino groups, by benzyloxy groups and so forth or even by a number of different types of substituents.

There are thus reached compounds with five cooperating atom groups: carbonyl, phenolhydroxyl, amino group and two ether groupings.

Two reaction series are formulated hereinafter by way of example:

On the right: the (simple) production of 1-(3'-hydroxyphenyloxy)-3-propenoxy-propanol-2 and -propanone-2.

On the left: the (more complicated) preparation of 1 - (2' - hydroxyphenyloxy)-3-di-ethylamino-ethyloxy-propanol-2 and -propanone-2.

and subsequent reaction of the halogenated final products with ammonia or primary amines and many others.

All propanetriol and propanediolon ethers, produced according to the invention, correspond to the general formulae:

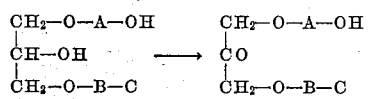

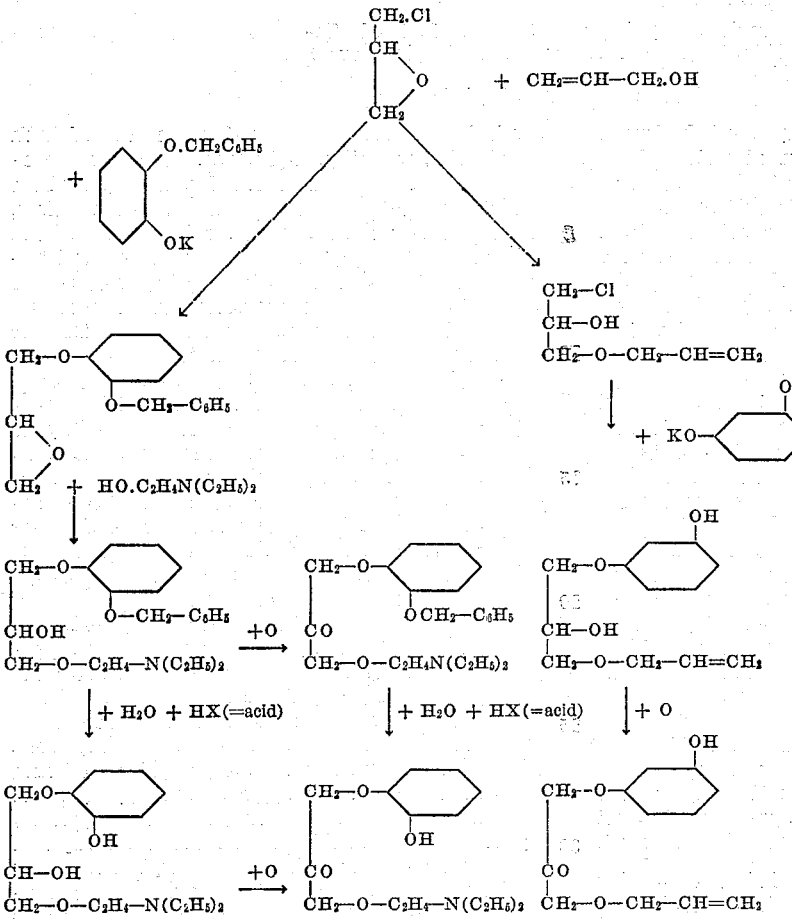

Epibromo- or -iodohydrin reacts like epichlorohydrin but without affording an advantage. Like pyrocatechine and resorcin, other polyphenols, for example hydroquinone, pyrogallol, dihydroxynaphthalenes, polyhydroxy-anthracene derivatives, and so on, in the form of their derivatives with a free hydroxyl group may be reacted. Also their derivatives substituted on a carbon atom of alkyl, alkoxy groups, halogen, by nitro or carboxyalkyl groups and many others. Other alcohols or amino alcohols, ketone alcohols, the esters of hydroxy acids, enolic compounds, in short, all hydroxyl compounds, which do not contain any disturbing substituents, react like allyl alcohol and diethyl-amino-ethanol.

It is possible in most cases to subsequently introduce substituents, which are to be contained in the final product, but whose presence during the reaction would disturb the initial or intermediate products. For example, primary amino groups bound to aryl, by using the corresponding nitro compounds and reduction in known manner of the final nitro compounds obtained; primary or secondary amino groups bound to alkyl, by using the corresponding halogen compounds In these
A indicates an arylene radical,
B indicates an alkylene or alkenylene radical, and
C indicates hydrogen or nitrogen, substituted by two monovalent radicals or a bivalent radical.

The new compounds are to be used partly as such, according to the substitution, especially as sedatives, hypnotics, analgesics or the like, partly as intermediate products for the preparation of technical and pharmaceutical products.

The present invention is illustrated by the following examples. The parts are by weight, where nothing other is said.

*Example 1*

Epichlorohydrin is converted, in known manner, by heating for some hours with several times the quantity of alcohol in an autoclave up to 140–150° C. into the glycerine chlorohydrin ethyl ether, boiling point 740 mm., 179–180° C.

100 parts of pyrocatechine and 125 parts of glycerine monochlorohydrin-ethyl ether are heated gradually to 80° C. in 1500 parts of alcohol with 63 parts of potassium carbonate whilst stirring and maintained at this temperature until estimation of ionogenic chlorine indicates almost complete conversion (duration 15-20 hours). Filtering is effected from the separated potassium chloride (66 parts instead of calculated 66.9 parts), the alcohol is distilled off and the residue fractionated in vacuo, whilst under 2.5 mm. pressure after a first running of unchanged chlorethyline, between 120° C. and 140° C. unchanged pyrocatechine, then at 174–178° C. the new compound passes over. It forms a colorless, moderately viscous liquid; it is soluble in water, particularly in heat, more easily in alkalis. Two free hydroxyls are indicated by the hydroxyl number, found at 516, whilst 529 is calculated for the 1-(2'-hydroxy-phenoxy-1')-3-ethoxy propanol-2.

Methyl, propyl, butyl or amyl alcohol instead of ethyl alcohol give final products with very similar properties.

*Example 2*

Epichlorohydrin is converted into the glycerine chlorhydrin allyl ether, boiling point$_{15}$ mm. 93–97° C., in known manner by heating in an autoclave up to 140–150° C. for several hours with several times the quantity of allyl alcohol.

100 parts of pyrocatechine and 135 parts of glycerine chlorhydrin allyl ether are, while stirring, gradually heated to 80° C. in 1500 parts of alcohol with 63 parts of potassium carbonate and (preferably in a nitrogen atmosphere) maintained at this temperature until estimation of ionogenic chlorine indicates almost complete conversion (duration 15-20 hours). Filtering is effected from the separated potassium chloride, the alcohol is distilled off and the residue fractionated in vacuo. After a first running of unchanged initial products the hydroxy-phenoxy propenoxy propanol distils. It is liquid, difficultly soluble in water, but easily in alkali lyes, and boils sharply, boiling point$_{0.4}$ mm. 192–193° C. The hydroxyl number has been found as 489, whilst for 2 hydroxyls the value 500 is calculated. The compound adds each time one molecule of chlorine, bromine, iodochloride and so on by forming the corresponding dihalogen derivatives. With bases they form salts of which those of the alkalis are easily soluble in water.

By using bromoallyl alcohol instead of allyl alcohol there is obtained the corresponding compound.

*Example 3*

Pyrocatechine is converted, by careful reaction with benzyl chloride in the presence of potassium carbonate, whilst moderately heating, into its monobenzyl ether, which is obtained pure after removing small quantities of by-products capable of being separated by reason of their insolubility in alkalis (pyrocatechine-dibenzyl ether, benzyl oxide), then washing out any unchanged pyrocatechine by means of water. Boiling point$_{12}$ mm. 172° C.; the Zerewitinoff determination gave 102% of the theoretical CH$_4$.

100 parts of the monobenzyl ether dissolved in a solution of 33 parts of potassium hydroxide and 200 parts of water, are reacted, whilst avoiding an increase in temperature, with 70 parts of epichlorohydrin and the mixture is shaken for 2 days, whereupon the calculated amount of 128 parts of the liquid compound have separated under the aqueous layer. By vacuum fractionation of the previously washed and dried substance the o-benzyloxy-epiphenyline or the ($\beta,\gamma$-epoxypropyl)-(2-benzyloxyphenyl)-ether is obtained as a colorless liquid, boiling point$_2$ mm. 206–208° C. in a yield of 87% of the theory.

Equal parts by weight of o-benzyloxy-epiphenylene and diethylamino ethanol are heated for 20 hours up to 180° C. in a nitrogen atmosphere. The excess diethylamino-ethanol is driven from the solution, 1-o-benzyloxy-phenoxy-3-diethylaminoethyloxy-propanol-2 is separated from the residue by means of dilute sulfuric acid from small quantities of neutral substances and bleached by norite.

The solution of the base in five to six times the quantity of n-hydrochloric acid is kept for 15 hours in reflux at light boiling. Then the benzyl chloride formed is removed by shaking out, the solution treated with lye up to phenol-phthalein alkaline reaction, a little unsplit benzyl base shaken out, the solution made again alkaline to bicarbonate and the free phenolic base extracted by means of ether. (Formula series page 2 left hand, bottom.) Like all dialkyline bases, the compound is a liquid; it dissolves clearly in acids and alkalis. The hydrochloride forms white crystals, melting at 136–139° C.

The benzyloxy-epiphenyline reacts, as well as with diethylamino-ethanol, with the isomer bases, like methyl propylamino-ethanol and methyl-isopropylamino ethanol; or with the homologues, for example methyl - isobutylamino - ethanol and methyl-tertiary butyl-amino ethanol; the intermediate products thus obained yield the corresponding basic propandiol and propandiolon ethers.

Oxidation to the corresponding ketone may be carried out as follows:

100 parts of 1-benzyloxyphenoxy-3-diethylamino-ethoxypropanol-2 are dissolved in 120 parts of glacial acetic acid. Whilst strongly stirring, a solution of 18 parts of chromium trioxide, 10 parts of water and 200 parts of glacial acetic acid is allowed to flow within 8 hours into the solution maintained at 20–22° C., and stirring is continued until the chromic acid reaction disappears. The glacial acetic acid is distilled off in vacuo at 20–25° C., the residue made alkaline to sodium carbonate, extracted by means of ether and the oxidation product isolated from the ether solution. There are obtained 89 parts of 1-benzyloxyphenoxy-3-diethylamino-ethoxy-propanone-2 which, as calculated, yield 95 parts of hydrochloride.

For splitting off the benzyl group, the solution of the salt is maintained for 12 hours at light boiling in 110% of the equimolecular quantity of n-hydrochloric acid, the resulting benzyl chloride removed by extraction, then the solution is made strongly alkaline and freed, by means of benzene, from residues of non-split benzyl ether. From the alkaline solution is separated, by adjusting to bicarbonate alkaline reaction, the free aminophenol-ketone, 1-(2'-hydroxy-phenoxy) - 3 - diethylaminoethoxy-propanone-2, a viscous, golden-yellow liquid, easily soluble in alkalis with the formation of phenolate, which is partly precipitated by alkali in excess. It is also easily soluble in acids, forming very hygroscopic liquefying salts.

The free amino-phenol-ketone may also be obtained by first converting the 1-o-benzyloxyphenoxy-3-diethylaminoethoxy-propanol as indicated above by splitting off the benzyl residue, into the free amino-phenol-alcohol and oxidising the same to the ketone under the above indicated conditions. This method, however, is less practical as the free amino phenol is more sensitive than its derivative with the masked hydroxyl group.

Instead of the benzyl radical there can also be used the carbobenzyloxy- or carbomethoxy radical for masking one of the OH-group of the pyrocatechine.

*Example 4*

100 parts of o-benzyloxy-epiphenyline and 200 parts of N-hydroxy - ethyl - piperidine (boiling point$_{20 mm.}$ 90–91° C.) are maintained for 20 hours at about 210° C. by passing over carbon dioxide, then the resulting excess of base is distilled off at 20 mm. up to 120° C. The residue is dissolved in several times its weight of 2n-hydrochloric acid, heated for 6 hours on reflux and the cooled still acid mass stirred with benzene to remove the benzyl chloride, then made phenolphthalein alkaline and further stirred with benzene to remove little benzyl base.

From the solution hereupon made bicarbonate alkaline, 1-(2'-hydroxyphenoxy-1')-3-piperidethyloxy-propanol-2 precipitates as a very viscous, non-crystallisable liquid. N-content 4.6% calculated 4.7%. The compound dissolves clearly in acids and alkalis.

*Example 5*

Pyrocatechine is transformed into the monobenzyl ether by means of benzyl chloride in the presence of potassium chloride, while moderately heating. After the separation of small quantities of by-products capable of being removed by reason of their insolubility in alkalis, washing out of some unchanged pyrocatechine by means of water, there is obtained the monobenzyl ether in a pure form, boiling point$_{12mm.}$ 172° C. 100 parts of the latter are dissolved in a solution of 33 parts of potassium hydroxide and 200 parts of water, 70 parts of epichlorohydrin are added thereto without heating and the mixture is shaken for 1 to 2 days, whereupon 128 parts of the reaction product have been separated out in form of a heavier liquid. The reaction product is now extracted, washed, dried and distilled. Thus one obtains the (β,γ-epoxypropyl)-(2-benzyloxyphenyl)-ether or the benzyloxy epiphenyline, boiling point$_2$ $_{mm.}$ 206–208° C., yield 87 per cent.

The ether is heated up to 150–170° C. for about 20 hours with the double quantity by weight of N-hydroxyethylmorpholine (boiling point$_{20 mm.}$ 112° C.), then the exceeding hydroxyethylmorpholine is removed by heating in vacuo up to about 120°–125° C., the residue taken up in diluted hydrochloric acid and a little quantity of admixture of non-basic substance is shaken out.

The acid solution contains benzyloxyphenoxy-morpholinyl-ethoxypropanol-2; it is, if necessary, decolorised by means of animal charcoal, adjusted with hydrochloric acid to approximately 2n-HCl and maintained in a light boiling condition under reflux during 12–15 hours. Then the benzyl chloride thus split off is removed by shaking out, the solution treated with an alkali until phenolphthalein alkaline reaction is reached and small traces of non-split benzyl compound are shaken out. Now the solution is made again alkaline to bicarbonate, thus rendering the phenolic base free, which is then extracted by means of ether or the like. The o-hydroxyphenoxy-morpholinyl-ethyloxy-propanol obtained by distillation off of the solvent is a viscous liquid which is easily and clearly soluble in alkalis and also in acids. The hydrochloride, sulfate and other salts with inorganic acids are rather hygroscopic, the tartrate, citrate, benzoate and the salts with dialkyl barbituric acids are less or not at all hygroscopic.

The (epoxypropyl)-(benzyloxyphenyl)-ether reacts in the same manner with other alkamines, for example with diethylamino-ethanol, N-hydroxy-ethyl-piperidine, methyl-propylaminoethanol, methylisobutylamino-ethanol, N-hydroxy-ethyltetrahydro-quinoline and others. The intermediate products thus obtained give by selective splitting by means of acids or hydrogen the corresponding free phenolic bases.

From the intermediate product, benzyloxy-phenoxy-morpholinyl-ethoxy-propanol made according to the above example, 100 parts are dissolved in 120 parts of glacial acetic acid. While thoroughly stirring a solution of 18 parts of chromium trioxide, 10 parts of water and 200 parts of glacial acetic acid is allowed to run winthin 8 hours into this solution maintained at 20–22° C. and stirring is continued until the chromic acid reaction disappears. The glacial acetic acid is distilled off in vacuo at 20–25° C., the residue made alkaline to sodium carbonate and extracted by means of ether. From this ethereal solution one obtains 89 parts of 1-benzyloxy-phenoxy-3-morpholinyl - ethoxy - propanone-2, which after neutralisation with hydrochloric acid yields 95 parts of hydrochloride.

For splitting off the benzyl group the solution of the salt is maintained for 12–15 hours at light boiling in 110% of the equimolecular quantity of n-hydrochloric acid. The resulting benzyl chloride is removed by extraction, the solution is made strongly alkaline and freed, by means of benzene, from small residues of non-split benzyl compound. From the alkaline solution is separated by adjusting to bicarbonate alkaline reaction, the free 1-(2'-hydroxyphenoxy)-3-morpholinyl-ethoxy-propanone-2. The product is a golden-yellow, viscous liquid, easily soluble in alkalis under formation of phenolate, which is partly precipitated by alkali in excess. It is also easily soluble in acids under formation of hygroscopic, partly readily liquescent salts.

This compound is also obtained by first converting the intermediate product, benzylhydroxy-phenoxy-morpholinyl-ethoxy propanol, by splitting off the benzyl radical, into the free aminophenol-alcohol and then oxidising the same to the ketone under the above indicated conditions. This order of succession, however, is less practical, because the free amino phenol is more sensitive than its benzyl derivative.

In the same manner as benzyloxyphenoxy-morpholinyl-ethoxy-propanol the analogously constituted compounds can be oxidised, which instead of the morpholinylethoxy group contain another alkamine radical, such as for example the following groups: diethylaminoethoxy-, piperidylethoxy-, tetrahydroisoquinolinylethoxy-, morpholinylpropyloxy-, morpholinyl-hydroxy-propyloxy- and the like.

In the above examples there may also be used epibromo- or epiiodohydrin instead of epichlorohydrin. These compounds are, however, unfavourable.

What we claim is:

1. A process for the manufacture of 1-o-hydroxy-phenoxy-3-alkoxy - 2 - propanones, comprising causing epihydrin ethers of the formula

to add a compound of the class consisting of pyrocatechine, pyrocatechine-monobenzylether, pyrocatechine - monocarbomethoxy - ether and pyrocatechine - monocarbobenzyloxyether, to form the 1:3-dihydroxy-propanolethers of the formula

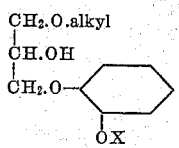

wherein X means a member of the group consisting of H, benzyl, carbomethoxy and carbobenzyloxy, splitting off the group X different from H and oxidizing these secondary alcohol ethers to the corresponding ketones of the formula

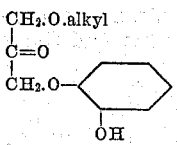

2. A process for the manufacture of 1-o-hydroxyphenoxy-3-alkoxy-2-propanones, comprising causing epihydrin ethers of the formula

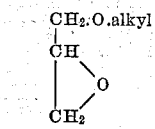

to add a compound of the class consisting of pyrocatechine, pyrocatechine-monobenzylether, pyrocatechine - monocarbomethoxyether and pyrocatechine-monocarbobenzyloxyether, to form the 1:3-dihydroxypropanolethers of the formula

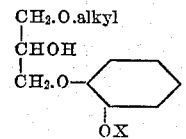

wherein X means a member of the group consisting of H, benzyl, carbomethoxy and carbobenzyloxy, oxidizing these secondary alcohol ethers to the corresponding ketones of the formula

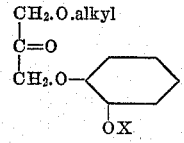

and splitting off the group X different from H.

3. A process for the manufacture of 1-o-hydroxyphenoxy-3-alkoxy-2-propanones, comprising causing epihydrin ethers of the formula

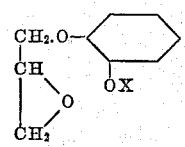

wherein X means a member of the group consisting of H, benzyl, carbomethoxy and carbobenzyloxy, to add an aliphatic hydroxy compound to form the 1:3-dihydroxypropanolethers of the formula

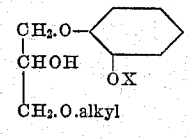

and oxidizing these secondary alcohol ethers to the corresponding ketones of the formula

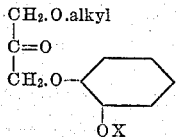

4. A process for the manufacture of 1-o-hydroxyphenoxy-3-alkoxy-2-propanones, comprising causing epihydrin ethers of the formula

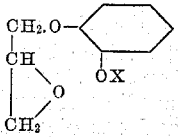

wherein X means a member of the group consisting of H, benzyl, carbomethoxy and carbobenzyloxy, to add a hydroxy compound of the formula OH.alkylene.N=R wherein R represents a member of the group consisting of two monovalent aliphatic radicals and one divalent aliphatic radical, to form the 1:3-dihydroxypropanolethers of the formula

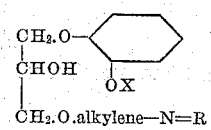

oxidizing these secondary alcohol ethers to the corresponding ketones of the formula

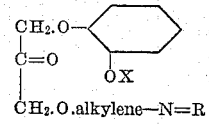

and splitting off the group X different from H.

5. A process for the manufacture of 1-o-hydroxyphenoxy-3-alkoxy-2-propanones, comprising causing epihydrin ethers of the formula

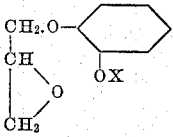

wherein X means a member of the group consisting of H, benzyl, carbomethoxy and carbobenzyloxy, to add a hydroxy compound of the formula

OH.$C_2H_4$.N=R wherein R represents a member of the group consisting of two monovalent aliphatic radicals and one divalent aliphatic radical to form the 1:3-dihydroxypropanolethers of the formula

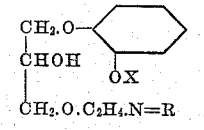

oxidizing these secondary alcohol ethers to the corresponding ketones of the formula

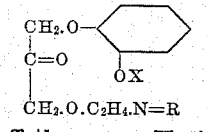

and splitting off the group X different from H.

6. A process for the manufacture of 1-(2'-hydroxyphenoxy - 1') - 3 - morpholinylethyloxypropanone-2, comprising causing o-benzyloxy-epiphenyline to add N-hydroxyethylmorpholine, oxidizing the secondary alcohol group of the 1-(2'-oxyphenoxy-1')-3-morpholinyl-ethyloxy-propanol-2 to the keto group and splitting off the benzyl group.

7. The 1-o-hydroxyphenoxy-3-alkoxy-propane derivatives of the general formula

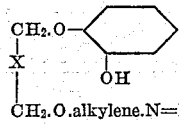

wherein X means one member of the group consisting of CHOH and CO, R represents a member of the group consisting of two monovalent aliphatic radicals and one divalent aliphatic radical, being colorless to slightly colored compounds, forming salts with acids and possessing valuable therapeutical properties.

8. The 1-o-hydrophenoxy-3-alkoxy-propane derivatives of the general formula

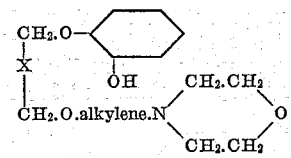

wherein X means one member of the group consisting of CHOH and CO, being colorless to slightly colored compounds forming salts with acids and possessing valuable therapeutical properties.

9. The 1-(o-hydroxyphenoxy-1')-3-morpholinylethoxy-propanol-2 of the formula

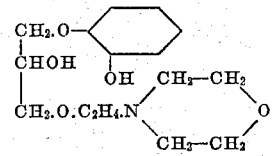

being a viscous liquid, clearly soluble in alkalis and acids, possessing valuable therapeutical properties.

10. The 1-(o-hydroxyphenoxy-1')-3-morpholinylethoxy-propanone-2 of the formula

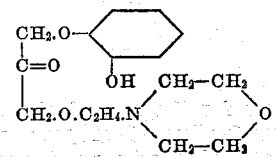

being a golden-yellow, viscous liquid, clearly soluble in alkalis and acids, possessing valuable therapeutical properties.

ADOLF GRÜN.
WILLY STOLL.